United States Patent [19]
Komiya et al.

[11] Patent Number: 5,424,763
[45] Date of Patent: Jun. 13, 1995

[54] COLOR MISREGISTRATION-FREE COLOR IMAGE FORMING APPARATUS

[75] Inventors: Kenichi Kōmiya, Yokohama; Jiro Egawa, Yokosuka; Kyōichi Okada, Chita; Hirōkazu Izawa, Aichi, all of Japan

[73] Assignee: Kabushiki Kaisha Toshiba, Kawasaki, Japan

[21] Appl. No.: 903,606

[22] Filed: Jun. 24, 1992

[30] Foreign Application Priority Data

Jun. 26, 1991 [JP] Japan .................. 3-154335

[51] Int. Cl.⁶ .................. G01D 9/42; G01D 15/06; H02P 5/46
[52] U.S. Cl. .................. 347/116; 347/232; 347/248; 358/412; 318/85
[58] Field of Search .............. 358/410, 412, 480, 481, 358/496, 504; 346/108, 157, 160; 355/326, 327; 318/85, 78, 632

[56] References Cited

U.S. PATENT DOCUMENTS

| | | | |
|---|---|---|---|
| 3,862,365 | 1/1975 | Kobayashi et al. | 358/412 X |
| 4,461,999 | 7/1984 | Wolf et al. | 358/412 X |
| 4,578,689 | 3/1986 | Spencer et al. | 346/160 |
| 4,695,778 | 9/1987 | Chito et al. | 318/85 X |
| 4,760,251 | 7/1988 | Shimada et al. | 358/412 X |
| 4,795,950 | 1/1989 | Ota et al. | 318/85 X |
| 4,860,035 | 8/1989 | Meuleman et al. | 346/157 |
| 4,963,899 | 10/1990 | Resch, III | 346/157 |
| 5,032,853 | 7/1991 | van Stiphout et al. | 346/157 |
| 5,083,140 | 1/1992 | Peterson et al. | 346/107 A |

*Primary Examiner*—Joseph W. Hartary
*Assistant Examiner*—Randy W. Gibson
*Attorney, Agent, or Firm*—Limbach & Limbach

[57] ABSTRACT

In a color image forming apparatus such as a color laser printer, misregistration of colors of an output image along a subscanning direction is minimized so as to prevent accumulation of color misregistrations in the output image. In the apparatus, a photosensitive drum motor and a transfer drum motor are driven by motors exclusively provided thereto. The apparatus includes a photosensitive drum motor controller and a transfer drum motor controller respectively provided for speed-controlling the photosensitive drum motor and the transfer drum motor. By these motor controllers, a phase difference between a frequency generator signal from the motor and a phase reference signal is checked. Even if the phase difference exceeds a predetermined range of phase, the motor controller controls the motor so that the phase difference quickly falls within the predetermined range of phase.

7 Claims, 8 Drawing Sheets

COLOR MISREGISTRATION-FREE COLOR IMAGE FORMING APPARATUS

BACKGROUND OF THE INVENTION

1. Field of the Invention

The present invention relates to a transfer type color image forming apparatus, e.g., a color laser printer, a color digital copying machine, or the like and, more particularly, to a driving technique of an image carrier and a transfer medium support member of the color image forming apparatus.

2. Description of the Related Art

For example, in a transfer type color image forming apparatus such as a color laser printer, an image carrier such as a photosensitive drum and a transfer medium support member such as a transfer drum are brought into contact with each other, and are synchronously rotated. Beam light is scanned on the image carrier to form a latent image on the image carrier, and the formed latent image is developed into a color toner image. The developed color toner images are sequentially transferred onto a transfer medium supported and conveyed by the transfer medium support member to overlap each other, and the color toner images on the transfer medium are thermally fixed.

In such a color image forming apparatus, conventionally, a motor controller using Phase-Locked Loop (PLL) control is used in synchronous rotation between the image carrier such as the photosensitive drum and the transfer medium support member such as the transfer drum.

When a phase comparison output as a result of phase comparison in the PLL control is filtered through a low-pass filter, a phase control signal having a signal level proportional to a phase difference between a phase comparison reference signal and a Frequency Generator (FG) signal is supplied within a phase difference range between $-\pi$ and $+\pi$.

Figure 8A:
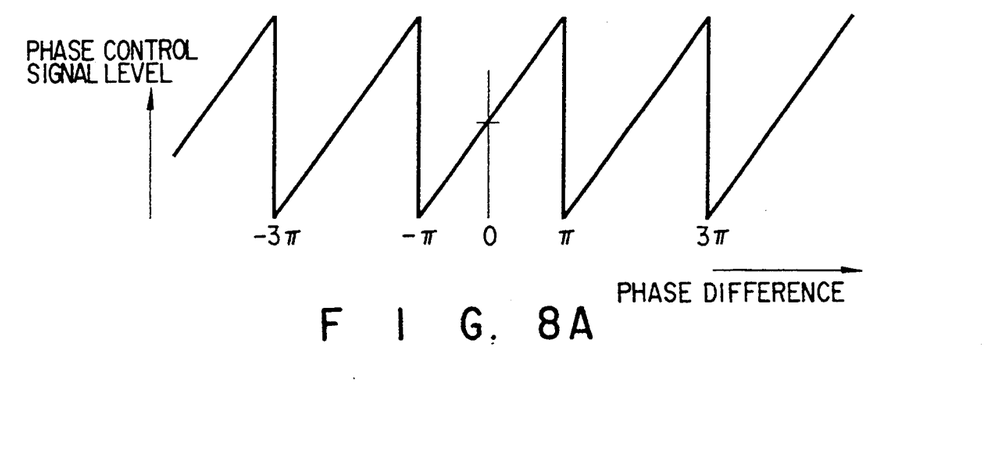
FIGS. 8A to 8C are timing charts showing circuit operations of a phase comparator when the present invention is not applied.
Figure 8B:
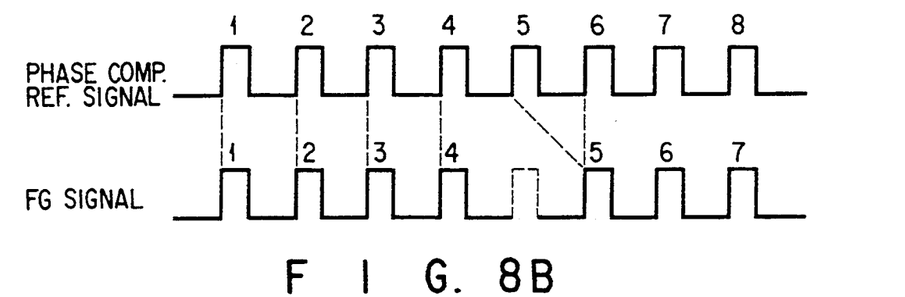

However, when an abnormality such as an abrupt variation in load for a motor occurs, no FG signal at the fifth cycle may be input at the fifth cycle of a phase comparison reference signal, and the FG signal at the fifth cycle may be input at the sixth cycle, as shown in, e.g., FIG. 8B.

In this state, the phase comparison reference signal and the FG signal at the fifth cycle should have a phase difference of $+\pi$ or more. However, the phase comparison reference signal at the sixth cycle and the FG signal at the fifth cycle are compared with each other, and a phase comparison result is output in a state wherein a phase is shifted by $2\pi$. More specifically, as shown in FIG. 8A, the same output as in a phase range between $-\pi$ and $+\pi$ is undesirably obtained in a range shifted by an integer multiple of $2\pi$ from a given phase difference.

Figure 8C:
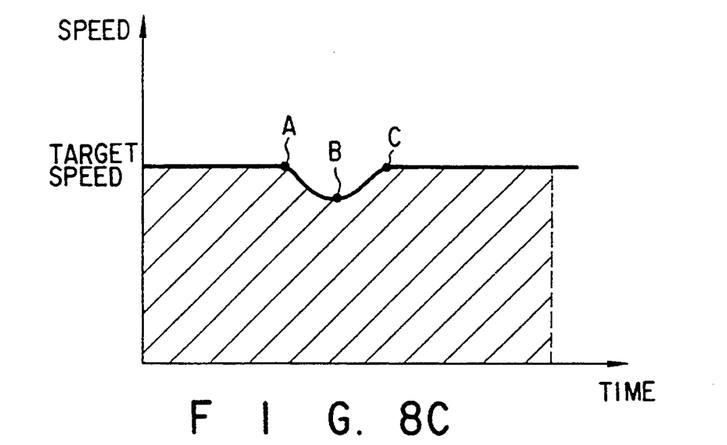

As shown in FIG. 8C, assume that a variation in speed begins to occur at a point A in FIG. 8C, the speed is decreased up to a point B, and the phase difference between the FG signal of a motor and the phase comparison reference signal exceeds a range of $\pm\pi$. Thus, the motor is PLL-controlled in a phase (point C) delayed by an integer multiple of $2\pi$ from the phase comparison reference signal, and the phase delay (corresponding to a color misregistration amount in color image formation) cannot be recovered.

When the above-mentioned motor controller based on the PLL control using a phase comparator is applied to synchronous rotation between the image carrier and the transfer medium support member in the transfer type color image forming apparatus, even when image formation of the first color is ideally performed, if the phase difference between the FG signal of a motor and the phase comparison reference signal exceeds a range of $\pm\pi$ in the second color due to any variation in load, the motor is undesirably controlled in a phase advanced (delayed) by an integer multiple of $2\pi$ from the phase comparison reference signal, in other words, in a state wherein the rotational position is shifted, and image formation continues without recovering the phase advance (delay). Color misregistration in the sub scanning direction occurs in the output image after a portion causing a variation in speed.

SUMMARY OF THE INVENTION

It is, therefore, an object of the present invention to provide an image forming apparatus, which can minimize color misregistration in the sub and main scanning directions of an output image, and can eliminate accumulation of color misregistration when the present invention is applied to a transfer type color image forming apparatus such as a color laser printer.

An image forming apparatus of the present invention comprises a unit for forming image information on an image carrier by scanning a light beam on the image carrier along a main scanning direction; a unit for moving the image carrier along a subscanning direction which intersects the main scanning direction; a unit for generating a first signal in response to movement of the image carrier along the subscanning direction; and a unit for driving the moving unit in accordance with a phase difference between the first signal and a predetermined reference signal so as to achieve the movement of the image carrier along the subscanning direction. The driving unit drives the moving unit such that the movement of the image carrier along the subscanning direction is performed based on the phase difference when the phase difference falls within a predetermined range of phase, and that the movement of the image carrier along the subscanning direction is performed based on a second signal having a predetermined signal level when the phase difference does not fall within the predetermined range of phase.

According to an aspect of the present invention, units for respectively driving the image carrier and a transfer medium support member are independently arranged, so that a variation in load of the image carrier is not transmitted to the transfer medium support member, and a variation in load of the transfer medium support member is not transmitted to the image carrier. Furthermore, speed control, which can quickly converge the phase difference within the predetermined range even when the phase difference exceeds the predetermined range of phase, can be applied to the driving unit. Thus, color misregistration in the subscanning direction of an output image can be minimized, thus preventing accumulation of color misregistrations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described hereinafter with reference to the accompanying drawings.

Figure 2:
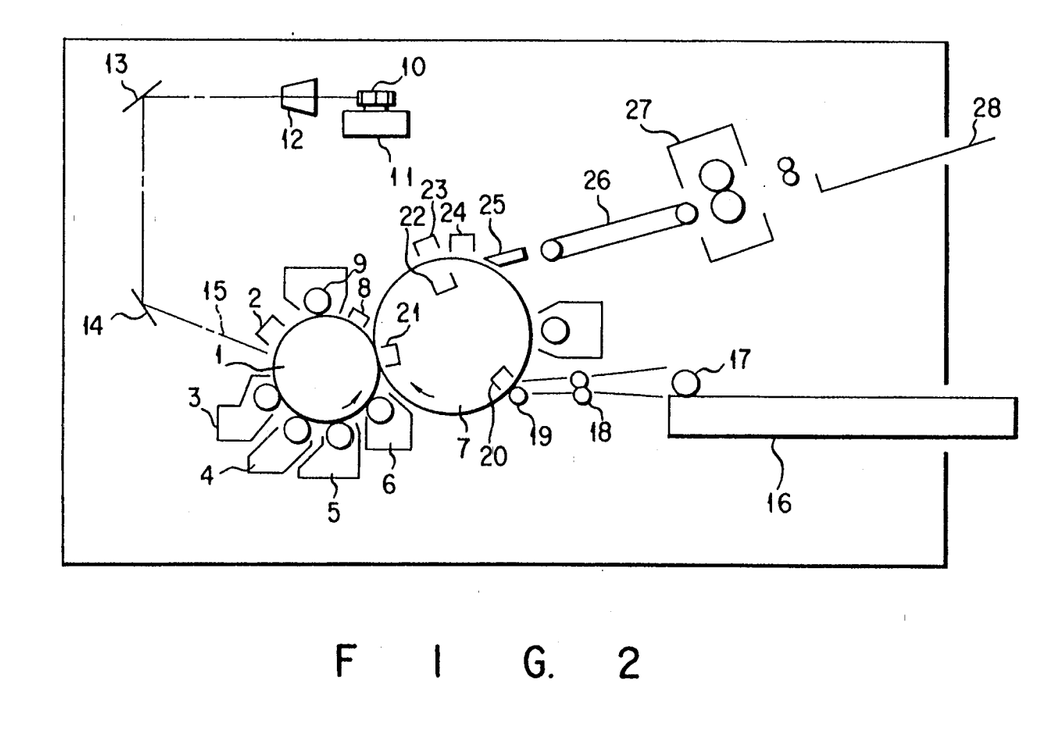
FIG. 2 is a schematic sectional view showing an internal arrangement of the color laser printer.

FIG. 2 schematically shows an internal arrangement of an image forming apparatus, e.g., a color laser printer, to which the present invention is applied. In FIG. 2, reference numeral 1 denotes a photosensitive drum as an image carrier, which is rotated counterclockwise in FIG. 2. Around photosensitive drum 1, charger 2 as a charging means, first, second, third, and fourth developers 3, 4, 5, and 6 as developing means, transfer drum 7 as a transfer medium support member, cleaning pre-discharger 8, and cleaner 9 are arranged in the order named. An exposure unit is arranged between charger 2 and first developer 3. The exposure unit includes polygon mirror 10 as a scanning means for scanning laser beam light emitted from a semiconductor laser oscillator (not shown), polygon motor 11 as a driving means for driving polygon mirror 10, lens 12, and mirrors 13 and 14.

Photosensitive drum 1 is rotated in a direction of an arrow in FIG. 2, and its surface is uniformly charged by charger 2. The surface of photosensitive drum 1 is exposed by laser beam light 15 emerging from the exposure unit between charger 2 and first developer 3, thereby forming an electrostatic latent image according to image data.

First to fourth developers 3 to 6 visualize electrostatic latent images on photosensitive drum 1 corresponding to their colors to color toner images. For example, first developer 3 develops a magenta image, second developer 4 develops a cyan image, third developer 5 develops a yellow image, and fourth developer 6 develops a black image.

On the other hand, a transfer paper sheet as a transfer medium is fed from paper feed cassette 16 by paper feed roller 17, and is temporarily registered by registration rollers 18. The paper sheet is then fed by registration rollers 18 toward attraction roller 19 and attraction charger 20 arranged at a position corresponding to an attraction position on transfer drum 7. Thereafter, the transfer paper sheet is electrostatically attracted on transfer drum 7 by attraction charger 20. The transfer paper sheet is supported and conveyed upon clockwise rotation of transfer drum 7 while being attracted on transfer drum 7.

The developed toner image on photosensitive drum 1 is transferred onto the transfer paper sheet attracted on transfer drum 7 by transfer charger 21 at a position where photosensitive drum 1 and transfer drum 7 oppose each other. When a plurality of color images are to be printed, a process, one cycle of which is defined by one revolution of transfer drum 7, is performed while switching the developers, thereby transferring a plurality of color toner images onto the transfer paper sheet to overlap each other. Note that the non-transferred toner on photosensitive drum 1 is discharged by cleaning pre-discharger 8, and is then cleaned by cleaner 9.

The transfer paper sheet on which the toner images are transferred is further conveyed upon rotation of transfer drum 7, and is discharged by pre-separation inner discharger 22, pre-separation outer discharger 23, and separation discharger 24. Thereafter, the transfer paper sheet is peeled from transfer drum 7 by peeling pawl 25, and is conveyed to fixing device 27 by conveyor belt 26. The toner image on the transfer paper sheet, which is heated by fixing device 27, is melt, and is fixed on the transfer paper sheet immediately after the paper sheet is discharged from fixing device 27. The transfer paper sheet, which completes the fixing process, is discharged onto tray 28.

Figure 1:
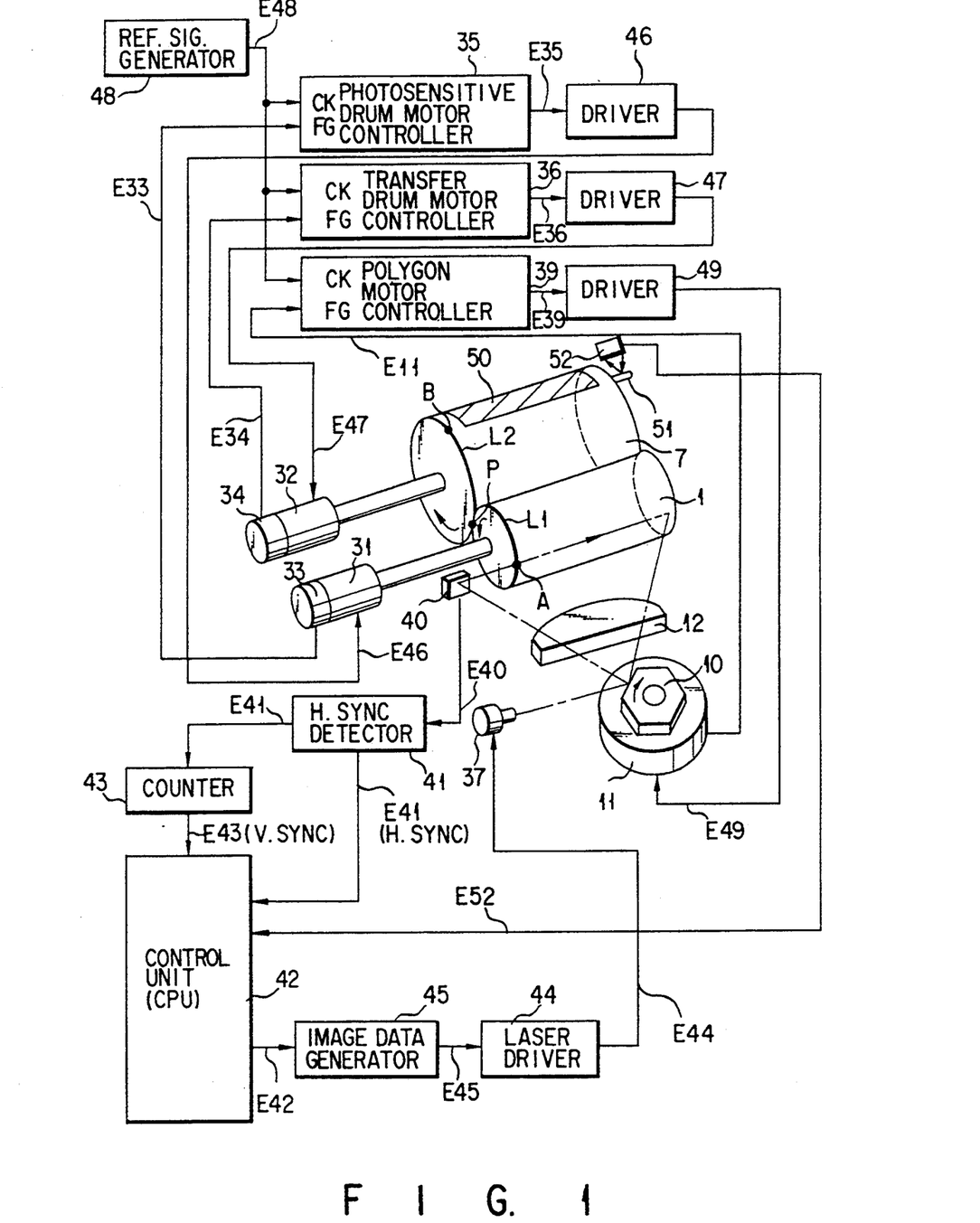
FIG. 1 is a block diagram showing an arrangement of a color laser printer including a motor controller according to an embodiment of the present invention.

FIG. 1 shows the schematic arrangement of the color laser printer according to the present invention.

In FIG. 1, a signal output from each constituting member x is denoted by symbol Ex (for example, member 35 outputs signal E35). Photosensitive drum 1 and transfer drum 7 are directly driven by photosensitive drum motor 31 and transfer drum motor 32, respectively. The rotational speeds of photosensitive drum 1 and transfer drum 7 are respectively detected by photosensitive drum encoder 33 and transfer drum encoder 34, which are respectively integrally attached to motors 31 and 32, and are respectively input as FG signals to photosensitive drum motor controller 35 and transfer drum motor controller 36.

In a scanning operation of laser beam light, laser beam light output from semiconductor laser oscillator 37 is scanned on photosensitive drum 1 in a direction of an arrow in FIG. 1 by polygon mirror 10 through lens 12. Polygon mirror 10 is rotated in a direction of an arrow in FIG. 1 by polygon motor 11, and FG signal E11 output from polygon motor 11 comprising a frequency generator is input to polygon motor controller 39.

The scanning beam light position of the laser beam light scanned by polygon mirror 10 is detected by beam light detector 40. Output E40 from detector 40 is binary converted by horizontal sync (H.SYNC) detector 41 into H.SYNC signal E41. H.SYNC signal E41 serves as a reference signal when information recording is performed from a predetermined position on photosensitive drum 1. H.SYNC signal E41 is input to control unit (CPU) 42, and is also input to counter 43. Counter 43 counts a predetermined number of H.SYNC signals E41 to generate vertical sync (V.SYNC) signal E43, and supplies signal E43 to control unit 42. Laser driver 44 drives semiconductor oscillator 37 with current signal E44 according to image signal E45 output from image data generator 45, which is connected to control unit 42.

Synchronization between photosensitive drum 1 and transfer drum 7 is attained by supplying common control clocks E48 from reference signal generator 48 to controller 35 for photosensitive drum motor driver 46 for driving photosensitive drum motor 31 and controller 36 for transfer drum motor driver 47 for driving transfer drum motor 32.

Synchronization of the scanning operation of laser beam light with respect to rotations of photosensitive drum 1 and transfer drum 7 is attained by obtaining common control clocks E48 to be input from reference signal generator 48 to controller 39 for polygon motor driver 49 for driving polygon motor 11 like in controllers 35 and 36.

In a color multiple transfer mode, alignment between a toner image on the photosensitive drum and the leading end position of a transfer paper sheet, and alignment between the leading end positions of toner images are required. For this purpose, reflection member 51 is provided at a position on transfer drum 7, corresponding to leading end position B of transfer paper sheet 50, and is detected by reflection type detector 52, thereby detecting the leading end position of transfer paper sheet 50. In this case, distance L1 from exposure position A of photosensitive drum 1 to transfer position P in the rotational direction is set to be equal to distance L2 from leading end position B of transfer paper sheet 50 to transfer position P in the rotational direction. The outer circumference of transfer drum 7 is set to be 63.5 $\mu m \times (n = \text{integer})$ since we have 63.5 $\mu m/\text{dot}$ if the resolutions in the main scanning direction (laser beam scan direction) and the sub scanning direction (direction perpendicular to the main scanning direction) are assumed to be 400 dots/inch.

In this arrangement, the operation of FIG. 1 will be briefly described below. When transfer drum 7 is rotated, and reflection type detector 52 detects leading end position B of transfer paper sheet 50, control unit 42 outputs V.SYNC signal E42 for the first color to image data generator 45 on the basis of H.SYNC signals E41 from H.SYNC detector 41. Image data generator 45 outputs image signal E45 to laser driver 44 for each horizontal scanning line from the generation timing of the next H.SYNC signal, thus beginning to form a latent image of the first color on photosensitive drum 1.

When formation of the latent image of the first color is completed, counter 43 counts a predetermined number (n) of H.SYNC signals E41, and generates V.SYNC signal E43. The V.SYNC signal for the second color is then output to image data generator 45 via control unit 42. Similarly, image data generator 45 outputs image signal E45 to laser driver 44 for each horizontal scanning line from the generation timing of the next H.SYNC signal, thus beginning to form a latent image of the second color on photosensitive drum 1.

Thereafter, every time counter 43 counts a predetermined number (n) of H.SYNC signals, it sequentially generates the V.SYNC signal (E43) for the third color, and the V.SYNC signal (E43) for the fourth color, and latent images of the third and fourth colors are sequentially formed.

Figure 3:
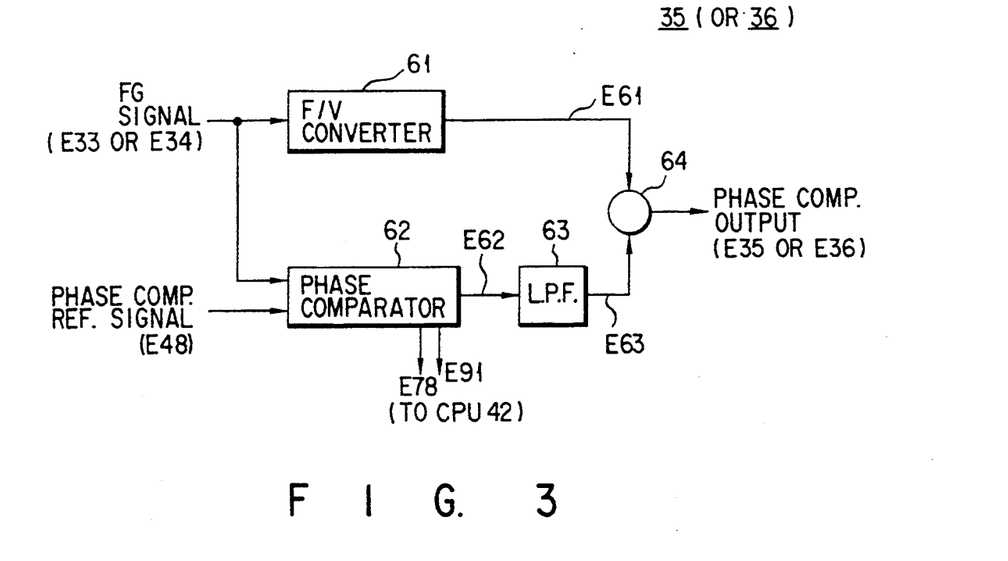
FIG. 3 is a diagram showing an internal arrangement of a motor controller (35, 36) shown in FIG. 1.

FIG. 3 shows the arrangement of photosensitive drum motor controller 35 or transfer drum motor controller 36. Controller 35 (or 36) comprises frequency/voltage (F/V) converter 61 for converting FG signal E33 (or E34) from encoder 33 (or 34) into voltage signal E61 according to its frequency, phase comparator 62 for comparing a phase difference between FG signal E33 (or E34) and phase comparison reference signal E48 from reference signal generator 48, low-pass filter (L.P.F) 63 for smoothing output E62 from phase comparator 62 by cutting a high-frequency component of output E62, and adder 64 for adding output E61 from F/V converter 61 to output E63 from L.P.F 63.

Figure 7:
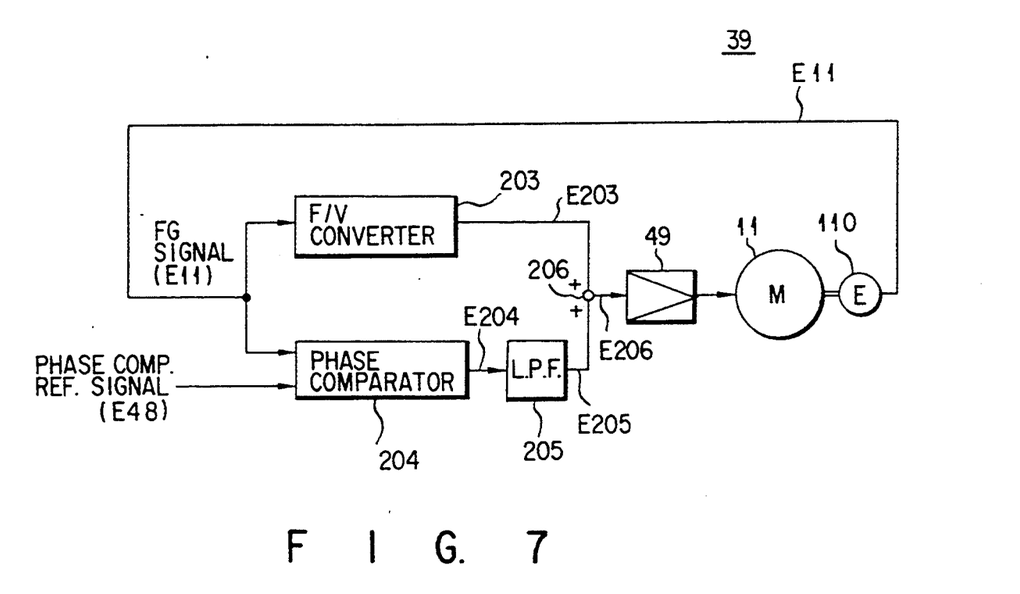
FIG. 7 is a schematic diagram showing an arrangement of a polygon motor control system shown in FIG. 1.

Note that polygon motor controller 39 can be arranged, as shown in FIG. 7.

In FIG. 7, motor 11 is connected to rotary encoder 110, and FG signal E11 for detecting the rotational position and the rotational speed of motor 11 is output from encoder 110. This FG signal E11 is input to F/V converter 203, and is converted into control signal E203 according to the frequency of FG signal E11 corresponding to the rotational speed of motor 11.

FG signal E11 output from encoder 110 is also input to phase comparator 204 to compare a phase difference with phase comparison reference signal E48. Comparison result E204 is converted into control signal E205 according to the phase difference through low-pass filter (L.P.F) 205.

Signal E206 obtained by adding control signal E203 according to the frequency and control signal E205 according to the phase difference by adder 206 is supplied to motor driver 49 so as to vary a voltage or current to be input to motor 11, thereby performing speed control of motor 11.

Figure 4:
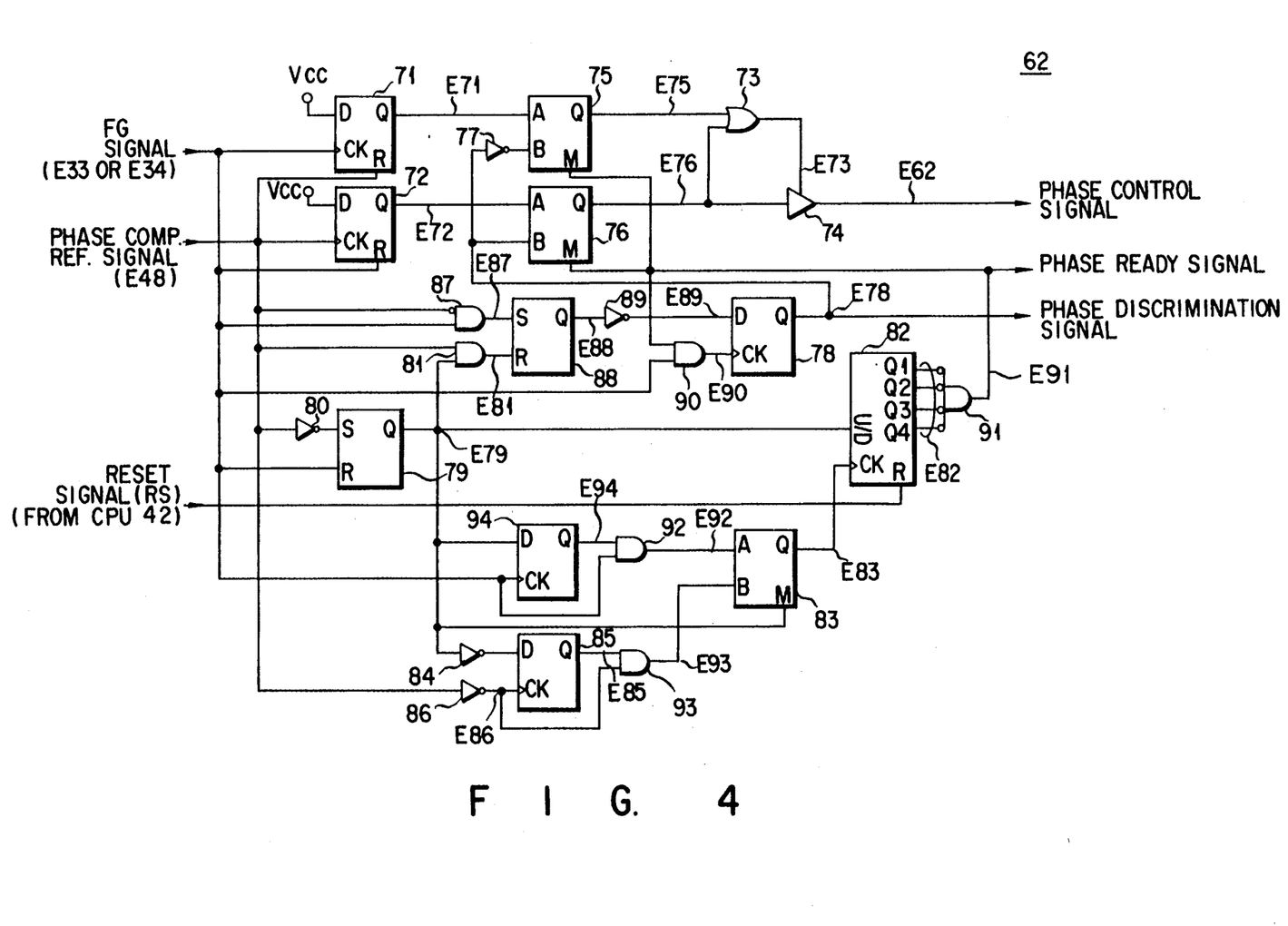
FIG. 4 is a circuit diagram showing a circuit arrangement of a phase comparator shown in FIG. 3.

FIG. 4 shows the arrangement of phase comparator 62. Comparator 62 compares a phase difference between the leading edge (transition from L level to H level) of phase comparison reference signal E48 with the leading edge of FG signal E33 (or E34), and comprises, for phase control signal E62, D flip-flops 71 and 72, multiplexers 75 and 76, OR gate 73, and buffer 74. More specifically, D flip-flop 71, which is set in response to FG signal E33 (or E34), and is reset in response to phase comparison reference signal E48, detects that the phase of FG signal E33 (or E34) advances from that of phase comparison reference signal E48. D flip-flop 72, which is set in response to FG signal E33 (or E34), and is reset in response to phase comparison reference signal E48, detects that the phase of FG signal E33 (or E34) is delayed from that of phase comparison reference signal E48.

OR gate 73 generates H-level output E73 when signal E75 or E76 (to be described later) is at H level. Buffer 74 supplies phase control signal E62, which goes to H (high) or L (low) level according to the operating states of D flip-flops 71 and 72 when output E73=H, and which goes to Z (high impedance) level when output E73=L.

Inputs A of multiplexers 75 and 76 are respectively connected to Q outputs E71 and E72 of D flip-flops 71 and 72. Input B of multiplexer 75 is connected to Q output E78 of D flip-flop 78 through NOT gate 77, and input B of multiplexer 76 is directly connected to Q output E78 of D flip-flop 78. Q output E75 of multiplexer 75 is connected to one input of OR gate 73, and Q output E76 of multiplexer 76 is connected to the other input of OR gate 73 and the input of buffer 74.

Q outputs E75 and E76 of multiplexers 75 and 76 are determined by the state of phase ready signal E91 input to mode input M (to be described later). When mode input M (E71) is at H level, input A is selected, and when the phase difference of signal E33 (or E34) from signal E48 falls within a range between $-\pi$ and $+\pi$, predetermined phase control signal E62 is obtained. On the other hand, when mode input M is at L level, phase discrimination signal E78 (input B of D flip-flop 75 or 76) is selected.

As will be described later, when the phase difference between phase comparison reference signal E48 and FG signal E33 (or E34) falls outside the predetermined range between $-\pi$ and $+\pi$, phase discrimination signal E78 goes to H level when the phase of FG signal E33 (or E34) advances from that phase comparison reference signal E48 by $-\pi$ or more, and goes to L level when the phase of FG signal E33 (or E34) is delayed from that phase comparison reference signal E48 by $+\pi$ or more. At this time, phase comparison reference signal E48 is maintained to be a predetermined value.

When the phase difference between phase comparison reference signal E48 and FG signal E33 (or E34) falls within the predetermined range (from $-\pi$ to $+\pi$), phase ready signal E91 is set at H level. In this case, multiplexers 75 and 76 select inputs A.

When the phase difference between phase comparison reference signal E48 and FG signal E33 (or E34) falls outside the predetermined range (from $-\pi$ to $+\pi$) (when the phase difference is equal to or smaller than $-\pi$, or is equal to or larger than $+\pi$), phase ready signal E91 is reset to L level. In this case, inputs B of multiplexers 75 and 76 are selected, and the level of output E62 of phase comparator 62 is maintained to be a value (H or L) determined by phase discrimination signal E78.

RS Flip-flop 79 receives phase comparison reference signal E48 at its set input S through NOT gate 80, and also receives FG signal E33 (or E34) at its reset input R. Q output E79 of RS flip-flop 79 is input to the input of AND gate 81, the U/D input of up-down counter 82, and mode input M of multiplexer 83. Output E79 is also input to input D of D flip-flop 85 through NOT gate 84. Clock input CK of D flip-flop 85 receives phase comparison reference signal E48 through NOT gate 86.

AND gate 87 calculates a logical product between an inverted signal of phase comparison reference signal E48 and FG signal E33 (or E34), and supplies logical product signal E87 to set input S of RS flip-flop 88. AND gate 81 calculates a logical product between phase comparison reference signal E48 and output E79 from RS flip-flop 79, and inputs logical product signal E81 to reset input R of RS flip-flop 88. Thus, signal E89, which goes to L level when the phase of the FG signal is delayed from that of the phase comparison reference signal, and goes to H level when the phase of the FG signal advances from that of the phase comparison reference signal, is obtained from Q output E88 of RS flip-flop 88 through NOT gate 89.

Output signal E89 from NOT gate 89 is input to input D of D flip-flop 78. Clock input CK of D flip-flop 78 receives output E90 from AND gate 90. The inputs of AND gate 90 receive phase ready signal E91 and FG signal E33 (or E34), respectively. When FG signal E33 (or E34) goes to H level, and when phase ready signal E91 is at H level, D flip-flop 78 holds the state of input D, and supplies phase discrimination signal E78 as its Q output E78.

In order to supply phase ready signal E91, the four inverting inputs of AND gate 91 are connected to all the Q1 to Q4 outputs (E82) of up-down counter 82 having a 4-bit arrangement. Only when the count state of up-down counter 82 is "0" (i.e., when all the four outputs Q1 to Q4 are at L level), the output from AND gate 91, i.e., phase ready signal E91 goes to H level; otherwise, signal E91 goes to L level.

Up-down counter 82 performs a count-up operation ($0 \rightarrow +1 \rightarrow +2 \rightarrow +3...$) when U/D input E 79 is at H level, and performs a count-down operation ($0 \rightarrow -15 \rightarrow -14 \rightarrow -13...$) when U/D input E79 is at L level. As will be described later, only when the phase difference between phase comparison reference signal E48 and FG signal E33 (or E34) falls within the predetermined range between $-\pi$ and $+\pi$, an operation for setting the state (output E82) of up-down counter 82 to be "0" is performed by supplying U/D input E79 and clock CK input E83 to counter 82, thereby generating phase ready signal E91.

The U/D input of up-down counter 82 is connected to the Q output of RS flip-flop 79. Q output E79 of RS flip-flop 79 goes to H level when the phase of FG signal E33 (or E34) advances from that of phase comparison reference signal E48; otherwise, it goes to L level.

On the other hand, the clock CK input of up-down counter 82 is connected to Q output E83 of multiplexer 83. Mode input M of multiplexer 83 is connected to Q output E79 of RS flip-flop 79. Thus, in cooperation with the count-up/down operation of up-down counter 82, multiplexer 83 selects input A in the count-up mode, and selects input B in the count-down mode. Input A of multiplexer 83 receives output E92 from AND gate 92, and input B receives output E93 from AND gate 93.

The inputs of AND gate 92 receive Q output E94 from D flip-flop 94 and FG signal E33 (or E34). Thus, when the phase of FG signal E33 (or E34) is delayed from that of phase comparison reference signal E48 by $+\pi$ or more, AND gate 92 outputs clock E92 for causing counter 82 to perform the count-down operation.

On the contrary, the inputs of AND gate 93 receives Q output E85 from D flip-flop 85 and inverted signal E86 of phase comparison reference signal E48, respectively. Thus, when the phase of FG signal E33 (or E34) advances from that of phase comparison reference signal E48 by $-\pi$ or more, AND gate 93 outputs clock E93 for causing counter 82 to perform the count-up operation.

Figure 5:
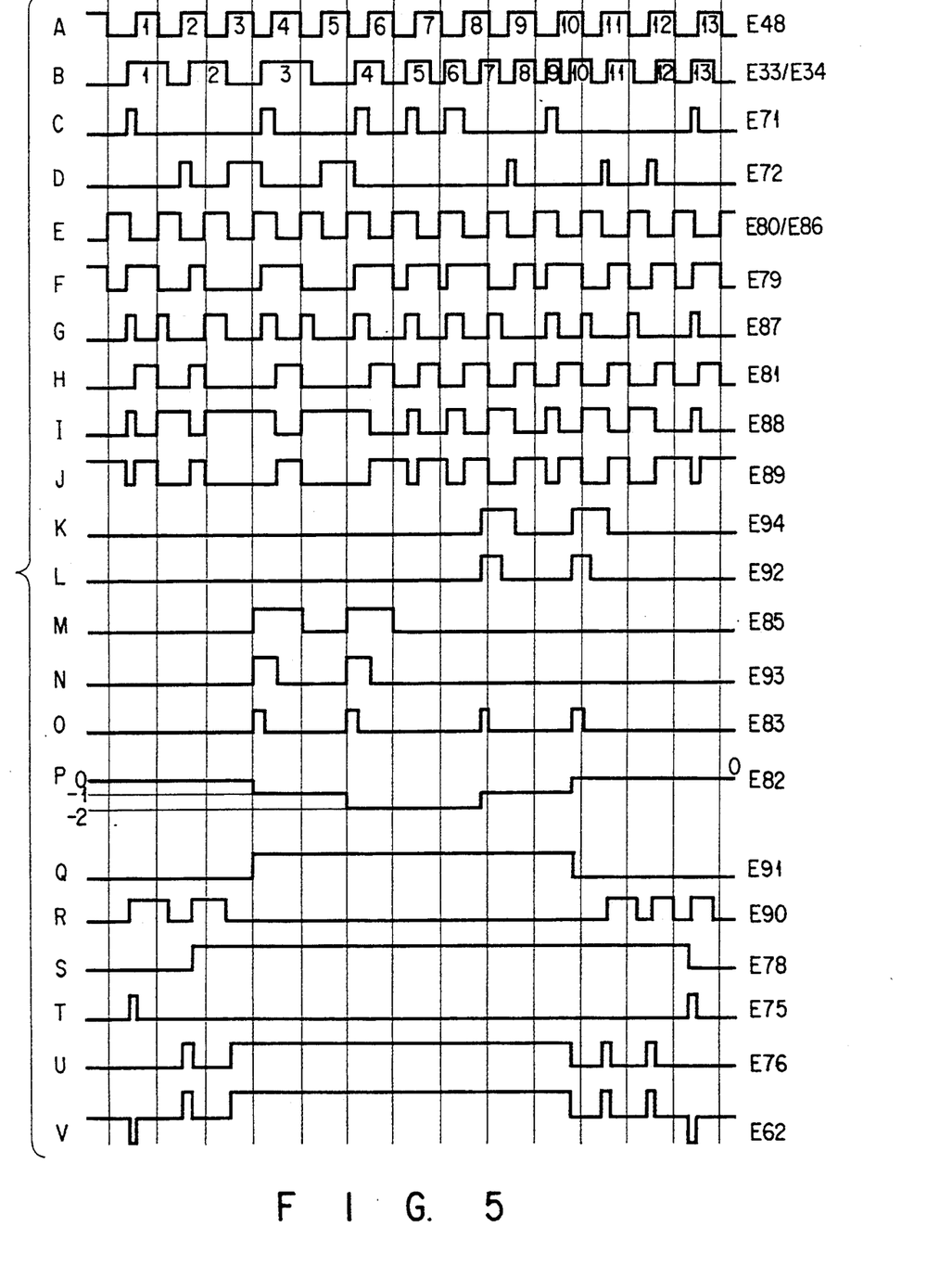
FIG. 5 are timing chart showing circuit operations of the phase comparator shown in FIG. 4.

The operation of phase comparator 62 with the above-mentioned arrangement will be described below with reference to FIGS. 5A to 5V.

When the relationship between phase comparison reference signal E48 and FG signal E33/E34 changes in a state shown in, e.g., FIGS. 5A and 5B, D flip-flop 71 for detecting phase advance and D flip-flop 72 for detecting phase delay respectively output "H"-level signals at timings shown in FIGS. 5C and 5D. Outputs E80/E86 from inverters 80 and 86 change, as shown in FIG. 5E.

RS flip-flop 79 is set in response to the leading edge of FG signal E33/E34, and is reset in response to the leading edge of the output from inverter 80 (i.e., the trailing edge of phase comparison reference signal E48). Output E79 from RS flip-flop 79 changes, as shown in FIG. 5F.

Output E87 from AND gate 87 has a waveform going to "H" level only when phase comparison reference signal E48 is at "L" level and FG signal E33/E34 is at "H" level, as shown in FIG. 5G. Output E81 from AND gate 81 has a waveform going to "H" level only when both phase comparison reference signal E48 and output E79 from RS flip-flop 79 are at "H" level, as shown in FIG. 5H.

RS flip-flop 88 is set in response to the leading edge of output E87 from AND gate 87, and is reset in response to the leading edge of output E81 from AND gate 81. Output E88 from flip-flop 88 changes, as shown in FIG. 5I, and output E89 from inverter 89 changes, as shown in FIG. 5J, according to a change in output E88.

D flip-flop 94 latches output signal E79 from RS flip-flop 79 at each leading timing of FG signal E33/E34, and its output E94 changes, as shown in FIG. 5K. Therefore, output E92 from AND gate 92 for logically ANDing output E94 from D flip-flop 94 and FG signals E33/E34 has a state shown in FIG. 5L.

D flip-flop 85 latches a signal supplied from RS flip-flop 79 and inverted by inverter 84 at each Leading timing of output E86 from inverter 86 (i.e., at each trailing timing of phase comparison reference signal E48), and its output E85 changes, as shown in FIG. 5M. Therefore, output E93 from AND gate 93 for logically ANDing output E85 from D flip-flop 85 and output E86 from inverter 86 has a state shown in FIG. 5N.

Multiplexer 83 selects output E92 from AND gate 92 in a state wherein "H"-level signal E79 is output from RS flip-flop 79, and selects output E93 from AND gate 93 in a state wherein "L"-level signal E79 is output from RS flip-flop 79. Count pulse E83 is output from output terminal Q of multiplexer 83 at timings shown in FIG. 5O, and is supplied to clock terminal CK of up-down counter 82.

More specifically, count pulse E83 is output when the phase difference ($\Delta F$) between phase comparison reference signal E48 and FG signal E33/E34 falls outside the predetermined range between $-\pi$ and $+\pi$, and is also output when the phase difference ($\Delta F$) increases/decreases beyond 2c from this state.

Therefore, up-down counter 82 counts the leading edges of count pulses E83. When output E79 from RS flip-flop 79 is at "H" level, counter 82 performs a count-up operation, and when it is "L" level, counter 82 performs a count-down operation.

More specifically, in the case shown in FIG. 5, at the leading timings of 3rd and 4th count pulses E83 (when the phase difference ($\Delta F$) between phase comparison reference signal E48 and FG signal E33/E34 increases to a range between $+\pi$ and $3\pi$, and when the phase difference ($\Delta F$) increases to a range between $+3\pi$ and $+5\pi$), since output E79 from RS flip-flop 79 is at "L" level, counter 82 performs the count-down operation. At the leading timings of 7th and 10th count pulses E83 (when the phase difference ($\Delta F$) decreases to a range between $+\pi$ and $+3\pi$, and when the phase difference ($\Delta F$) decreases to a range between $-\pi$ and $+\pi$), since output E79 from RS flip-flop 79 is at "H" level, counter 82 performs the count-up operation. Therefore, in this case, count value E82 of up-down counter 82 changes, as shown in FIG. 5P.

Thus, phase ready signal E91 output from NOR gate 91 goes to "L" level only when count value E82 of up-down counter 82 is "0" as an initial value, i.e., when the phase difference ($\Delta F$) between phase comparison reference signal E48 and FG signal E33/E34 falls within the predetermined range, i.e., a range between $-\pi$ and $+\pi$. On other hand, phase ready signal E91 goes to "H" level when count value E82 is other than the initial value ("0"), i.e., when the phase difference ($\Delta F$) falls outside the range between $-\pi$ and $+\pi$.

As a result, output E90 from AND gate 90 for logically ANDing phase ready signal E91 and FG signal E33/E34 changes, as shown in FIG. 5R. D flip-flop 78, which latches output signal E89 from inverter 89 at each leading timing of output E90 from AND gate 90, outputs phase discrimination signal E78 which goes to "H" level at a timing shown in FIG. 5S.

Multiplexer 75 selects output E71 from D flip-flop 71 when phase ready signal E91 is at "H" level (when the phase difference ($\Delta F$) between phase comparison reference signal E48 and FG signal E33/E34 falls within the range between $-\pi$ and $+\pi$). On the other hand, multiplexer 75 selects phase discrimination signal E78, inverted by inverter 77, when phase ready signal E91 is at "L" level (when the phase difference ($\Delta F$) falls outside the range between $-\pi$ and $+\pi$). Output E75 from multiplexer 75 has a state shown in FIG. 5T.

Multiplexer 76 selects output E72 from D flip-flop 72 when phase ready signal E91 is at "H" level. On the other hand, multiplexer 76 selects phase discrimination signal E78 when phase ready signal E91 is at "L" level. Output E76 from multiplexer 76 has a state shown in FIG. 5U.

As a result, as shown in FIG. 5V, phase control signal E62 output from buffer 74 goes to "L" level during a period wherein "H"-level signal E75 is output from only multiplexer 75, i.e., during a period wherein the phase of FG signal E33/E34 advances from that of phase comparison reference signal E48; signal E62 goes to "H" level during a period wherein "H"-level signal E76 is output from only multiplexer 76, i.e., during a period wherein the phase of FG signal E33/E34 is delayed from that of phase comparison reference signal E48; and signal E62 goes to Z level (high-impedance state) during other periods.

As described above, according to the arrangement of this embodiment, when the phase difference ($\Delta F$) is generated between phase comparison reference signal E48 and FG signal E33/E34, phase control signal E62 having a level according to the content (advance or delay) of the phase difference ($\Delta F$) is output. In this case, when the phase difference ($\Delta F$) falls outside the predetermined range between $-\pi$ and $+\pi$, since phase control signal E62 having a given value is continuously output, motor 31 or 32 is controlled based on signal E62, so that the phase difference ($\Delta F$) converges within the range between $-\pi$ and $+\pi$. When the phase difference ($\Delta F$) falls within the predetermined range between $-\pi$ and $+\pi$, the level of phase control signal E62 changes according to the phase difference ($\Delta F$), thus performing rotational position control of motor 31 or 32.

Therefore, even when the phase difference ($\Delta F$) between phase comparison reference signal E48 and FG signal E33/E34 is increased to $+5\pi$ or more, control for converging the phase difference ($\Delta F$) within the predetermined range can be reliably performed. As a result, the position control of the rotor of motor 31 or 32 can be precisely performed within the predetermined range between $-\pi$ and $+\pi$.

Up-down counter 82, which plays an important role upon execution of the above-mentioned control, performs a count operation only in an abnormal state wherein the phase difference ($\Delta F$) falls outside the predetermined range, i.e., the range between $-\pi$ and $+\pi$.

Therefore, counter 82 need only have a small count capacity, and the circuit arrangement can be prevented from becoming large in scale.

In addition, when an abnormality such as a abrupt variation in load occurs in motor 31 or 32, and when the phase difference (ΔF) between phase comparison reference signal E48 and FG signal E33/E34 falls outside the predetermined range, the abnormal state can be detected based on phase ready signal E91, and the phase shift direction (advance or delay) can be detected based on phase discrimination signal E78. Furthermore, the phase shift amount can be detected on the basis of count value E82 of up-down counter 82. Therefore, analysis of the abnormal state, or the like can be performed on the basis of these detection results (E91, E78, and E82).

Since the 4-bit up-down counter 82 is utilized, the above embodiment can cope with states up to an abnormal state wherein the phase difference (ΔF) between phase comparison reference signal E48 and FG signal E33/E34 is increased to a range corresponding to ±15 counts. When the number of bits of counter 82 is increased, an abnormal state in a wider range can be coped with. On the contrary, when the variation range of the phase difference (ΔF) is small, the number of bits of up-down counter 82 can be decreased to further simplify the circuit arrangement.

In the above embodiment, phase comparator 62 utilizes flip-flops in its principal part. However, the present invention may be similarly applied to a phase comparator utilizing other arrangements in its principal part.

Figure 6A:
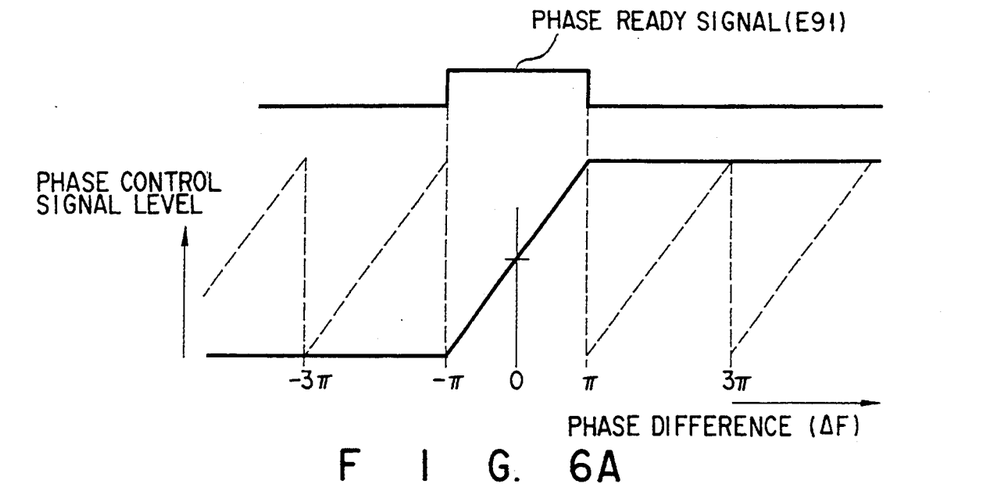
FIGS. 6A to 6C are views for explaining the circuit operation of the motor controller shown in FIG. 3.

For the sake of simplicity, an explanation will be given for the first and second colors in color image formation. In this case, the embodiment shown in FIG. 1 operates as follows. Assume that image formation of the first color is ideally performed, and the rotational speed of photosensitive drum motor 31 is decreased due to any variation in load during formation of a latent image of the second color. A case will be examined below wherein the phase difference between FG signal E33 from encoder 33 coupled to photosensitive drum motor 31 and phase comparison reference signal E48 becomes equal to or larger than $-\pi$, as shown in FIG. 6A. In this case, phase ready signal E91 changes from H level to L level. With this level change, although the position of the latent image is shifted immediately after a speed variation occurs, the shift can be recovered after several main scanning lines, and the position of the latent image is returned to the predetermined position.

Figure 6B:
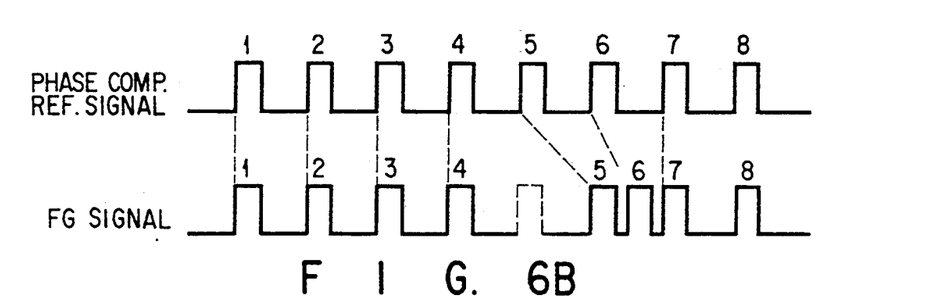
Figure 6C:
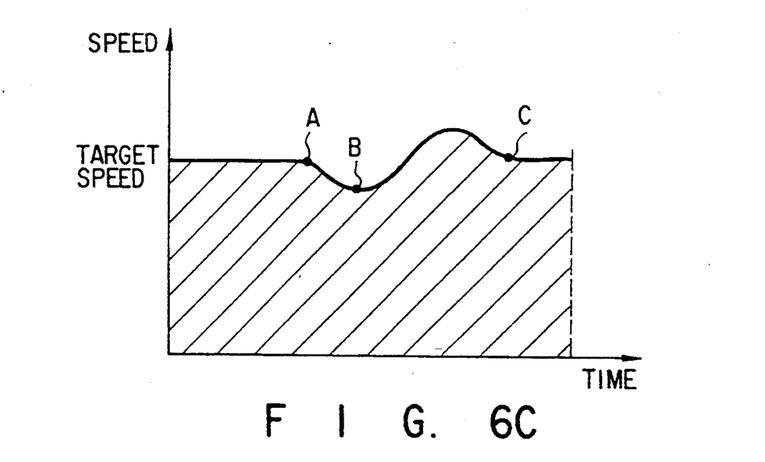

In a case shown in FIG. 6B, a speed variation occurs at the fifth cycle, and FG signal E33 is delayed by one cycle (one pulse). This delay leads to the above-mentioned position shift. The delay is recovered up to the seventh cycle, and the FG signal can be synchronized with the phase comparison reference signal at the seventh cycle. In FIG. 6C, a speed variation begins at point A in FIG. 6C, and a speed is decreased up to point B. However, thereafter, the speed begins to increase, and after the delay is recovered, the speed is recovered to a target speed at point C. Therefore, on a transferred image, color misregistration occurs in only a portion where the variation occurs and a portion where the delay is recovered. Thereafter, lines of the first and second colors can coincide with each other up to the trailing end of the image.

In this manner, according to the embodiment shown in FIG. 1, the motors for driving the photosensitive drum and the transfer drum are independently arranged, so that a variation in load of the photosensitive drum is not transmitted to the transfer drum, and a variation in load of the transfer drum is not transmitted to the photosensitive drum. Furthermore, the motor controllers, each of which can realize a motor rotation feed mechanism for, when a phase difference between a phase comparison reference signal and an FG signal falls outside a predetermined range, quickly converging the phase difference within the predetermined range, are adopted in speed control of the motor for driving the photosensitive drum and speed control of the motor for driving the transfer drum. Thus, color misregistration in the sub scanning direction of an output image can be minimized, and accumulation of color misregistration can be prevented.

Note that polygon motor controller 39 may comprise the motor controller shown in FIGS. 3 and 4 like in photosensitive drum motor controller 35 and transfer drum motor controller 36. In this case, for example, assume that image formation of the first color is ideally performed, and the rotational speed of polygon motor 11 varies due to any cause during scanning of polygon mirror 10 on a given line of the second color. With this variation, even when the phase difference between FG signal E11 from the encoder coupled to polygon motor 11 and the phase comparison reference signal becomes equal to or larger than $\pm\pi$, the trailing end of the scanning line can coincide with the predetermined position. Therefore, no color misregistration in the main scanning direction occurs.

Figure 9:
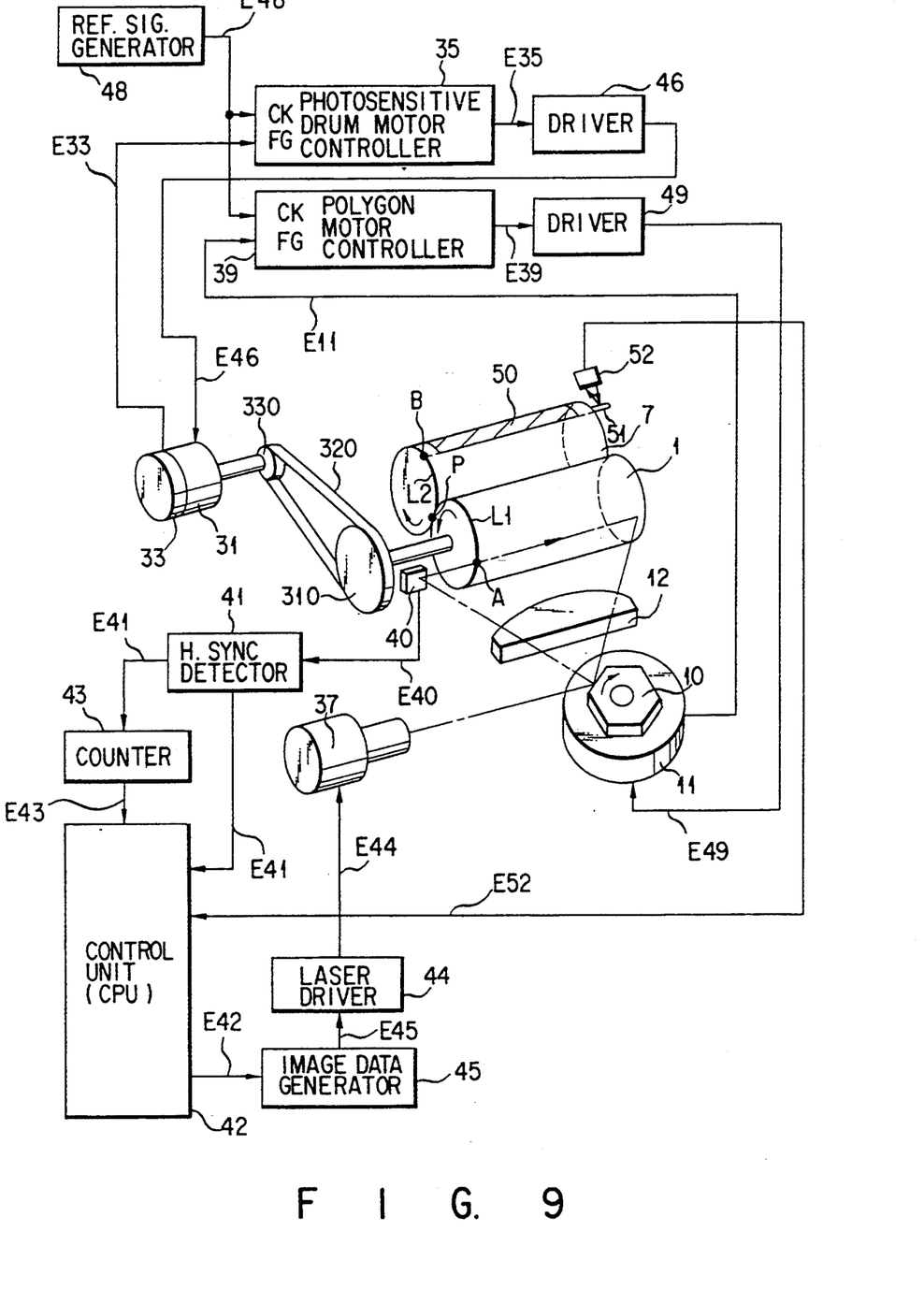
FIG. 9 is a block diagram showing an arrangement of a color laser printer including a motor controller according to another embodiment of the present invention.

FIG. 9 shows the schematic arrangement of a color laser printer according to another embodiment of the present invention. In FIG. 9, photosensitive drum 1 and transfer drum 7 are coupled through a gear mechanism (not shown). Photosensitive drum 1 is coupled to drum motor 31 through pulley 310, belt 320, and pulley 330. In this manner, photosensitive drum 1 and transfer drum 7 are interlocked with each other by a driving system mechanically coupled to single drum motor 31. The rotational speed of drum motor 31 is detected by drum encoder 33 integrally attached to drum motor 31, and is input as FG signal E33 to drum motor controller 35. In this manner, in FIG. 9, constituting members 32, 34, 36, and 47 in FIG. 1 are omitted. Other arrangements in FIG. 9 are the same as those in FIG. 1.

According to the embodiment shown in FIG. 9, the photosensitive drum and the transfer drum 1 are synchronously driven by the single motor. The motor controller, which can realize a motor rotation feed mechanism for, when a phase difference between a phase comparison reference signal and an FG signal falls outside a predetermined range, quickly converging the phase difference within the predetermined range, is adopted in speed control of the motor for driving the photosensitive drum and the transfer drum. Thus, color misregistration in the sub scanning direction of an output image can be minimized, and accumulation of color misregistration can be prevented.

In this embodiment, polygon motor controller 39 comprises a motor controller identical to that in the conventional apparatus. However, the motor controller shown in FIGS. 3 and 4 may be employed like in drum motor controller 36. In this case, for example, assume that image formation of the first color is ideally performed, and the rotational speed of polygon motor 11 varies due to any cause during scanning of polygon mirror 10 on a given line of the second color. With this variation, even when the phase difference between FG signal E11 from the encoder coupled to polygon motor 11 and the phase comparison reference signal becomes equal to or larger than ±π, the trailing end of the scanning line can coincide with the predetermined position. Therefore, no color misregistration in the main scanning direction occurs.

As described in detail above, according to the present invention, for example, when the present invention is applied to a transfer type color image forming apparatus such as a color laser printer, an image forming apparatus, which can minimize color misregistration in the sub and main scanning directions of an output image and can prevent accumulation of color misregistration, can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming apparatus comprising:
   means for forming image information on an image carrier by scanning a beam light on the image carrier along a main scanning direction;
   means for moving the image carrier along a subscanning direction which intersects the main scanning direction;
   means for generating a movement signal in response to movement of the image carrier along the subscanning direction;
   means for providing a predetermined reference signal;
   first means for detecting a phase difference between the movement signal and the predetermined reference signal so as to provide a phase control signal;
   second means for detecting the phase difference between the movement signal and the predetermined reference signal, the second detecting means providing a first phase ready signal, when the phase difference falls within a predetermined range [−π to +π of phase, and a second phase ready signal, when the phase difference falls outside the predetermined range −π to +π of phase; and
   first driving means for driving said moving means in accordance with the phase control signal, the first driving means moving the image carrier along the subscanning direction when the first phase ready signal is provided by said second detecting means, said first driving means including second driving means for driving said moving means in accordance with a specific value of the phase control signal when the second phase ready signal is provided by said second detecting means, so that a signal, obtained by delaying the movement signal by a period of time relating to a cyclic change of the movement signal, is synchronized to the predetermined reference signal.

2. An apparatus according to claim 1, wherein said forming means includes:
   means for scanning the beam light on the image carrier along the main scanning direction;
   means for generating a first signal in response to scanning of the beam light scanned by said scanning means; and
   means for activating said scanning means based on a second phase difference between the first signal and the predetermined reference signal so as to perform scanning of the light beam along the main scanning direction, in such a manner that the beam light is scanned along the main scanning direction based on the second phase difference when the second phase difference falls within a prescribed range of phase, and that the beam light is scanned along the main scanning direction based on a second signal having a prescribed signal level when the second phase difference does not fall within the prescribed range of phase.

3. An apparatus according to claim 2, further comprising:
   second moving means for moving a material to which the image information of the image carrier formed by said forming means is to be transferred, in synchronism with movement of the image carrier moved by said moving means;
   means for generating a third signal in response to movement of the material moved by said second moving means; and
   means for activating said second moving means based on a specific phase difference between the third signal and the predetermined reference signal so as to perform synchronized moving of the material, in such a manner that the material is moved based on the specific phase difference when the specific phase difference falls within a specific range of phase, and that the material is moved based on a fourth signal having a specific signal level when the specific phase difference does not fall within the specific range of phase.

4. An apparatus according to claim 1, further comprising:
   second moving means for moving a material to which the image information of the image carrier formed by said forming means is to be transferred, in synchronism with movement of the image carrier moved by said moving means;
   means for generating a movement signal in response to movement of the material moved by said second moving means; and
   means for activating said second moving means based on a specific phase difference between the movement signal and the predetermined reference signal so as to perform synchronized moving of the material, in such a manner that the material is moved based on the specific phase difference when the specific phase difference falls within a specific range of phase, and that the material is moved based on a signal having a specific level when the specific phase difference does not fall within the specific range of phase.

5. An apparatus according to claim 4, further comprising:
   means for developing the image information on the image carrier formed by said forming means to provide a visible image; and
   means for transferring the developed visible image on the image carrier to an image holding material.

6. An image forming apparatus comprising:
   means for scanning a beam light on an image carrier along a main scanning direction;
   means for generating a scan signal in response to scanning of the beam light scanned by said scanning means;
   means for providing a predetermined reference signal;

means for detecting a phase difference between the scan signal and the predetermined reference signal so as to provide a phase control signal;

means for activating said scanning means based on the phase control signal from said detecting means when the phase difference detected by said detecting means falls within a predetermined range $-\pi$ to $+\pi$ of phase, said activating means activating said scanning means based on a specific value of the phase control signal so that the movement signal is synchronized to the predetermined reference signal.

7. An image forming apparatus comprising:

means for forming image information on an image carrier by scanning a beam of light on the image carrier along a main scanning direction;

first moving means for moving the image carrier along a subscanning direction which intersects the main scanning direction;

second moving means for moving a material to which the image information of the image carrier formed by said forming means is to be transferred, in synchronism with movement of the image carrier moved by said first moving means;

means for generating a movement signal in response to movement of the material moved by said second moving means;

means for providing a predetermined reference signal;

means for detecting a phase difference between the movement signal and the predetermined reference signal so as to provide a phase control signal;

means for activating said second moving means based on the phase control signal from said detecting means when the phase difference detected by said detecting means falls within a predetermined range from $-\pi$ to $+\pi$ of phase and, when the detected phase difference falls outside the predetermined range from $-\pi$ to $+\pi$ of phase, said activating means activating said second moving means based on a specific value of the phase control signal so that the movement signal is synchronized to the predetermined reference signal.

* * * * *